United States Patent [19]
Lipton

[11] Patent Number: 5,835,098
[45] Date of Patent: Nov. 10, 1998

[54] METHOD AND SYSTEM FOR MANAGING COLOR PROFILES IN A DOCUMENT FOR MAKING THE DOCUMENT PORTABLE TO OTHER SYSTEMS

[75] Inventor: Daniel I. Lipton, San Francisco, Calif.

[73] Assignee: Apple Computer, Inc., Cupertino, Calif.

[21] Appl. No.: 646,529

[22] Filed: May 10, 1996

[51] Int. Cl.[6] .................................................. G06T 11/00

[52] U.S. Cl. ............................................................ 345/431

[58] Field of Search ............................. 395/131; 345/431

[56] References Cited

PUBLICATIONS

"Inside Macintosh ColorSync Utilities" pp. 1–1 to 1–75, 1993.

*Primary Examiner*—Almis R. Jankus
*Attorney, Agent, or Firm*—Sawyer & Associates

[57] ABSTRACT

A method and system for managing color profiles is disclosed in which unique identifications are created that have at least two parameters identifying a corresponding color profile. The unique identifications are then used to specify a particular color profile in a computer document by placing the unique identification in the document at each location where the color profile is used, eliminating the need in some cases to embed the entire color profile in the document multiple times.

22 Claims, 3 Drawing Sheets

METHOD AND SYSTEM FOR MANAGING COLOR PROFILES IN A DOCUMENT FOR MAKING THE DOCUMENT PORTABLE TO OTHER SYSTEMS

FIELD OF THE INVENTION

The present invention relates to a method and system for managing color profiles, and more particularly to a method and system for managing color profiles in a computer graphics system.

BACKGROUND OF THE INVENTION

Current computer systems provide individuals with opportunities to produce documents of professional quality, such as with desktop publishing software and graphics software programs. Documents produced by these programs typically include both font information and color matching information. Color matching information is data, such as red, green, and blue (RGB) values and CMYK (cyan, magenta, yellow, black) values, that are associated with objects and text in the document to control how the objects and text will appear when they are displayed and printed. Because RGB and CMYK values may differ depending on the particular device involved, color matching is offered as a standard component of some operating systems, such as System 7.5 from Apple Computer, for example.

Color matching enables the operating system to provide refined color management through the use of color profile objects. A color profile object is a device profile that is associated with a set of RGB or CMYK values in the document to describe the device to which the values are associated. Color profile objects enable the document to be portable so that it will have the same appearance when drawn by different devices. Typically, all color profiles objects supported by a particular computer system are stored in a system profile folder. Using these color profile objects, the operating system can convert and translate a color from a foreign device into the color of a native device.

When a document is created that includes color, a copy of the color profile object is embedded in the document at every location the color changes. Assume for example, that data was created for a document on a particular monitor and that data from a scanner is incorporated in the middle of the document. The document would include three color profile objects; a color profile object corresponding to the monitor at the beginning of the document, a color profile object corresponding to the scanner at the beginning of the scanner data, and then the color profile object for the monitor at the location where the document contents switched back to those created by the monitor.

In the past, color profiles were small objects (typically less than 32 k) so duplicating each color profile by embedding them in documents in each location they were used did not pose a significant problem. However, newer versions of graphics systems have improved color management and require more color information. This has resulted in color profiles becoming relatively large objects. For example, in some graphics systems, color profile objects may exceed a few hundred kilobytes of data. Repeatedly embedding such color profile objects into documents unnecessarily increases the size of the documents, which waste storage space and reduces the time to transmit the documents from one device to another. Accordingly, what is needed is an improved color profile management scheme. The present invention addresses such a need.

SUMMARY OF THE INVENTION

The present invention provides a method and system for managing color profiles. According to the present invention, unique identifications are created that include at least two parameters identifying a corresponding color profile. The unique identifications are then used to specify a particular color profile in a computer document by placing the unique identification in the document at each location where the color profile is used. From among the color profiles in a document, non-system color profiles are identified, and each are embedded in the document once for providing portability of the document to other systems. According to the system and method disclosed herein, the unique identifications for identifying color profile objects reduce the size of documents and eliminate the need to embed the entire color profile in the document multiple times.

DESCRIPTION OF THE INVENTION

The present invention relates to an improvement in managing color profiles. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
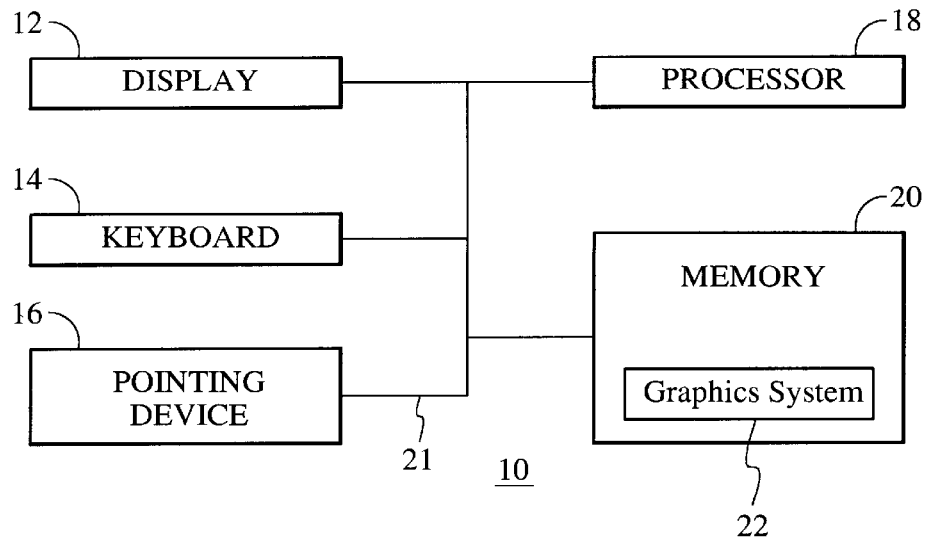
FIG. 1 is a block diagram illustrating a conventional computer system in which the present invention resides.

FIG. 1 is a block diagram illustrating a conventional computer system 10, which includes a display 12, a keyboard 14, a pointing device 16, a processor 18, and a memory 20, which are all connected by a bus 21. The processor 18 operates in conjunction with the memory 20 to execute a graphics system 22 that enables a user to create and manipulate graphics and text. In a preferred embodiment, the graphics system 22 may be similar to QuickDraw GX from Apple Computer, Cupertino, Calif.

Computer documents and files generated on the computer system 10 typically include both color profiles and font data to describe the colors and fonts in the document, respectively. In a broad sense, the way in which color profiles have been managed in the system 10 is analogous to how fonts have been managed. Like color profiles, bitmap fonts were originally quite small, and it did not create much overhead to simply record the entire font data in the file each time the fonts changed. However, present graphics systems take a different approach. Rather than recording the whole font into the file upon every occurrence, each font is embedded only once per document and thereafter referenced by a font name in each subsequent location.

This type of font management, however, is not directly applicable to color profile management (i.e., referencing a color profile in a document simply by a color profile name, rather than by the actual data). This is because font data are static, a font with the same unique name remains the same through time, whereas color profiles are dynamic. Over time, a user may change the information in a color profile object to reflect the fact that the monitor has degraded or has been recalibrated.

For example, assume that a color profile associated with a new monitor of type "X" that specifies the color 50% red as the values 0.5R, 0.0G, and 0.0B, and that five years later, that same color red appears dimmer on the monitor because of constant use. A user may recalibrate the monitor to restore the appearance of 50% red by updating the color profile associated with monitor so that the values 0.5R, 0.0G, and 0.0B combined with the updated information in the color profile produces the correct color. Since most, if not all, monitors of type X will degrade over time and not all of their color profiles will be recalibrated, simply embedding the X color profile name in a document like a font name, as opposed to embedding the color profile object, may not produce the same output over time.

The present invention is a method and system for managing color profiles that provides a set of information for uniquely identifying a color profile object in a document without embedding the color profile object into the document multiple times, while maximizing the ability to choose the correct color profile object to draw by using the unique identification information. The present invention will be described in terms of a preferred embodiment, the Apple QuickDraw GX Graphics System. However, one of ordinary skill in the art will recognize that the method is readily adaptable for other types of graphics systems and applications. To more particularly illustrate the color profile management method and system, refer now to FIG. 2 depicting a block diagram of one embodiment of such a system.

Figure 2:
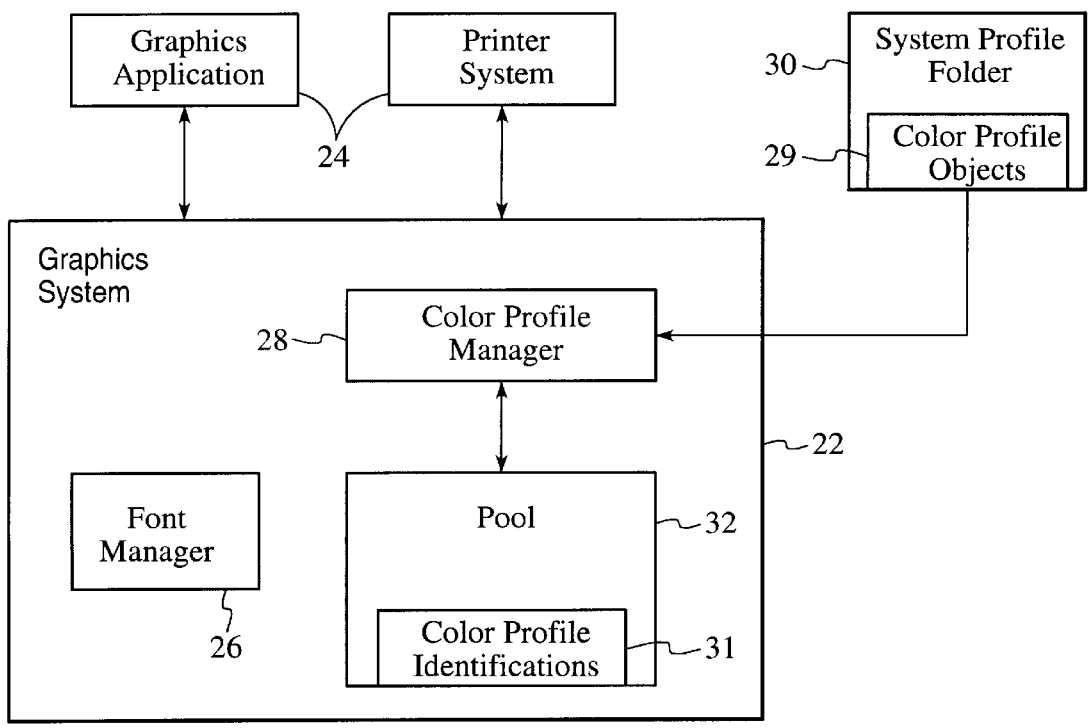
FIG. 2 is a block diagram depicting a graphics system in accordance with the present invention.

FIG. 2 is a block diagram depicting a graphics system 22 in accordance with the present invention. The purpose of the graphics system 22 is to service requests for graphics, color, and fonts from clients 24, such as graphics applications and printer systems, for example. The graphics system 22 includes a font manager 26 and a color profile manager 28. The font manager 26 references system fonts and fonts registered by the clients 24. The color profile manager 28 manages color profile objects 29 that are supported by the system 10 and stored in a system profile folder 30.

According to the present invention, the color profile manager 28 maintains a unique color profile identification 31 for each color profile object 29 found in the system profile folder 30, and document entries in a database pool 32. Each of the color profile identifications 31 includes a set of parameters that preferably provides the minimum amount of information necessary to uniquely identify a color profile object 29, while enabling the color profile manager 28 to determine whether the data in the color profile object 29 has been modified.

Figure 3:
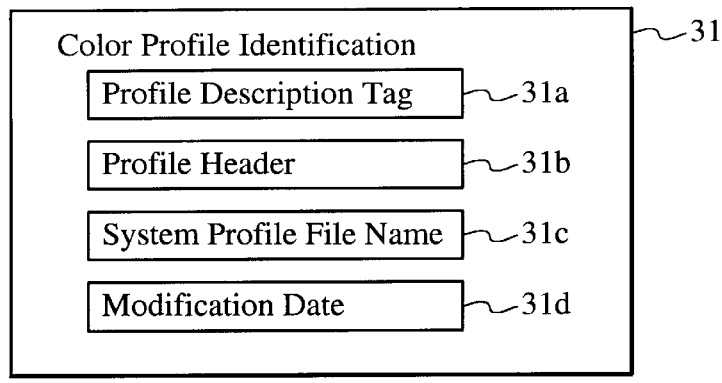
FIG. 3 is a diagram graphically illustrating the parameters comprising a color profile identification in a preferred embodiment of the present invention.

FIG. 3 is a diagram graphically illustrating the parameters comprising a color profile identification 31 in a preferred embodiment of the present invention. The color profile identification 31 includes a Profile Description tag 31a, a Profile Header 31b, a System Profile File Name 31c, and a Modification Date 31d. As appreciated by those with ordinary skill in the art, the order that the parameters are listed is illustrative.

The Profile Description tag 31a is generally the most analogous item in the color profile identification to a unique name, and the System Profile File Name 31c identifies the name of the file as it appears in the system profile folder 30. The Profile Header 31b includes various flags and fields describing the characteristics of the object to which it is associated with in a document. One such field is a rendering intent field which is used to modify the corresponding color profile object 29, as explained further below.

The Modification Date 31d is the date that the corresponding color profile object 29 was last calibrated. As stated before, some color profile objects 29 residing in the system may change over time due to calibration, either user-initiated or auto-initiated. For this reason, when accessing a color profile object by the unique identification, it is preferable to verify that the color profile identification in the document has the same modification date as the matching color profile object. Using this information, the system can warn the user that the output may be incorrect before expensive color printing resources are wasted. This allows the user to choose to abort the job or accept lower quality results.

Using a color profile identification 31, a color profile object 29 need only be embedded once in a document, if at all, regardless of the number of times it is referenced. When creating a document there are several methods for specifying a color profile object 29. One method is to embed the entire color profile object 29 at every location it is used in the document. This method guarantees that the document will be output correctly, but document size is compromised. Another method is to add all the color profile objects 29 to the document only once, then specify the color profile objects 29 using their respective color profile identifications 31. But this method, however, still compromises the size of the document.

The next best method for specifying a color profile object 29 is to never embed the entire color profile object 29 into the document, and instead reference the color profile object 29 by only its unique color profile identification 31. This approach guarantees that the document remains as small as possible. The problem is, however, the client 24 creating the document may have either created a color profile object 29 dynamically in its own memory space, or modified one of the system color profile objects 29 in its own memory space. When this occurs, the color profile manager 28 can no longer recognize the color profile object 29 once the client 24 closes the document, and the document may no longer be portable to other systems since those systems will likewise fail to recognize the color profile object 29. Therefore, when the document is subsequently read, output fidelity is compromised.

The present invention employs a hybrid approach to specify a color profile object 29. A color profile object 29 is first specified in a document only by its unique color profile identification 31. The color profile object 29 is then only embedded in the document once when it cannot be guaranteed that its unique color profile identification 31 will correctly identify a corresponding color profile object 29 in another system.

Figure 4:
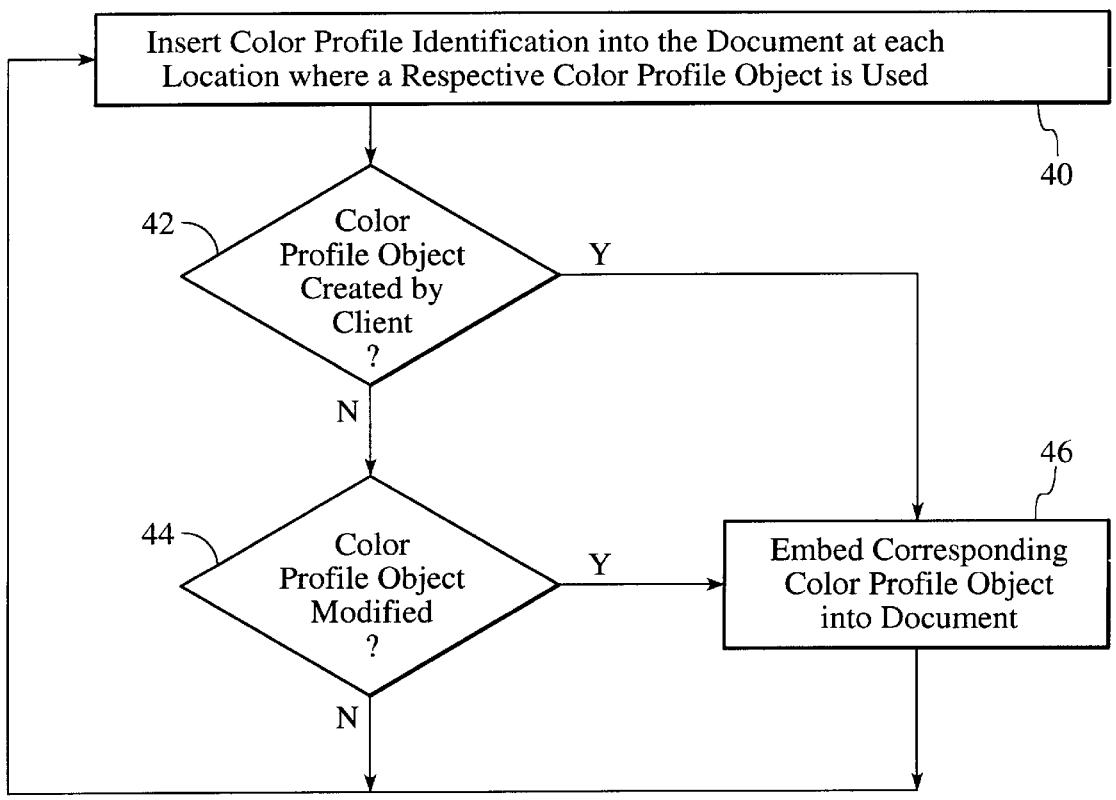
FIG. 4 is a flow chart illustrating the processing of a client when specifying color profile objects in a document in accordance with the present invention.

FIG. 4 is a flow chart illustrating the processing of a client 24 when specifying color profile objects in a document in accordance with the present invention. When the document is created, each object or text is associated with a color object 29. Instead of inserting the color profile object 29 in the document, the unique color profile identification 31 corresponding to the color profile object 29 is inserted into the document at each location where the respective color profile object 29 is used in step 40.

After a unique color profile identification 31 has been placed in the document in each location needed, it is determined whether the corresponding color profile object 29 also needs to be embedded into the document for portability. According to the preferred embodiment of the present invention, only color profile objects 29 identified as "non-system" color profile objects will be embedded in the document.

As shown in FIG. 4, a color profile object is determined to be a non-system color profile object if the color profile object 29 was either created by the client 24 in step 42, or modified so that the color profile object can no longer be recognized by its unique color profile identification 31 in step 44. If the color profile object 29 is determined to be a non-system color profile object, then the color profile object once is embedded in the document in step 46. The process then repeats until no more data objects in the document are associated with color profile objects 31.

Embedding non-system color profile objects in the document allows the document to be output on other systems besides the one in which is was created. Otherwise, specifying a non-system color profile object in a document by a color profile identification only, would not enable another system accessing the document to correctly find a corresponding color profile object, since that color profile object had either been created or modified by the original system. The determination of whether to embed a color profile object is based on the probability of other systems supporting that particular color profile.

Referring again to FIG. 2, when a document containing color profile identifications 31 is to be subsequently displayed or printed by a client 24, the color profile manager 28 examines every color profile identification 31 associated with each object in the document, and then searches document entries and thereafter the system entries in the pool 32 for location of a color profile object 29 that best matches the parameters in the color profile identification 31. If found, the matching color profile object 29 is returned to the client 24, as described in further detail below.

Figure 5:
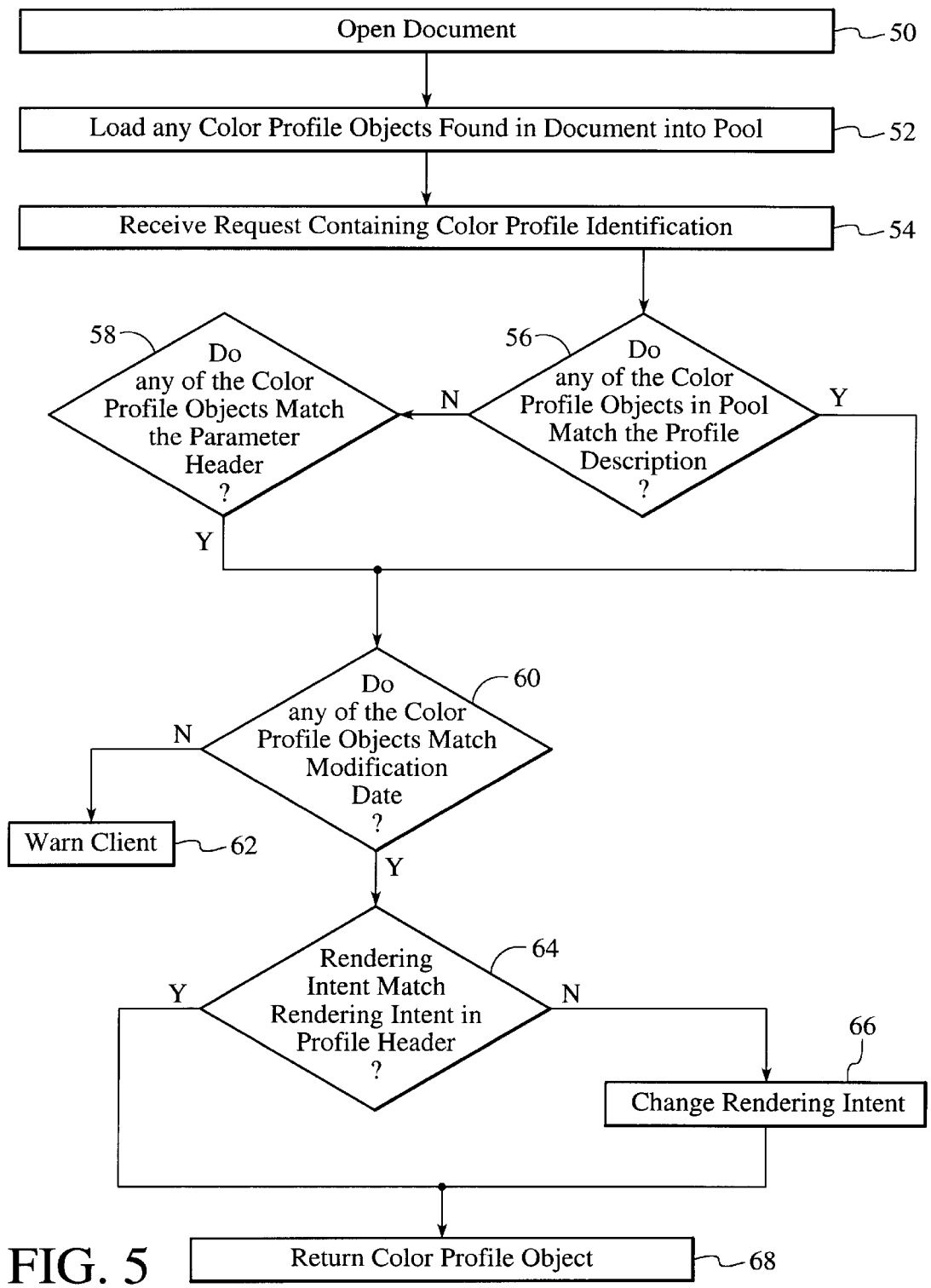
FIG. 5 is a flow chart depicting the processing of the color profile manager when searching for a color profile object.

FIG. 5 is a flow chart depicting the processing of the color profile manager 28 when searching for a color profile object. The document displayed or printed by a client 24 is first opened by the system 10 in step 50, and the color profile manager 28 loads any color profile objects 29 embedded in the document into the pool 32 in step 52. In a preferred embodiment, the color profile objects 29 from the document are stored as document entries in the pool 32 to distinguish them from system entries. For each object in the document having an associated color, the color profile manager 28 receives a request containing the corresponding color profile identification 31 from the client 24 in step 54. As stated above, the purpose of the request is for the color profile manager 28 to find and return the color profile object 29 that best matches the color profile identification 31 in the request.

In a preferred embodiment, the client 24 passes a request for color profile object to the color profile manager 28 by calling a function called GXNewColorProfileFromUniqueID, which passes the unique color profile identification 31 to the color profile manager 28 as a function parameter.

After the color profile manager 28 receives the request, the color profile manager 28 first searches for color profile objects 29 that match the profile description tag 31a, and then narrows in on the best match by finding color profile objects 29 that match the other parameters of the color profile identification 31 as well.

The color profile manager 28 first searches the document entry section of the pool 32 for color profile objects 29 that match the Profile Description tag 31a of the color profile identification 31 in step 56. If no match is found, then the color profile manager 28 searches the remainder of the pool 32 for color profile objects 29 that match the Profile Header 31b in step 58. In a preferred embodiment, all the fields of the Profile Header 31b are used in the search except the rendering intent. Because the rendering intent can be easily changed, the search should not be allowed to fail when an object matches the Profile Header 31b in every respect except the rendering intent.

The color profile manager 28 narrows the list of color profile objects 29 matching the Profile Description tag 21a and the Profile Header 31b by searching for color profile objects 29 that match the Modification Date 31d in step 60. When no color profile object 29 can be found that matches the Modification Date 31d, then the color manager 28 warns the client 4 in step 62 that proceeding to print/draw the document may produce incorrect results, which allows the client to then abort. If a color profile object 29 matches the Modification Date 31d, then it is determined if the color profile object's rendering intent matches the rendering intent specified in the Profile Header 31b in step 64. If the color profile object's rendering intent does not match the rendering in the Profile Header 31b, then the color profile object's rendering intent is changed to match the specified rendering intent in step 66, and the color profile object 29 is returned to the client 24 in step 68.

As stated above, the pool 32 is initialized to contain the color profiles contained in the system profiles folder 30. In a preferred embodiment, a separate pool 32 is maintained for each client 24, and the pool 32 can be added to or detracted from by the client using function calls. Entries in the pool 32 may be color profile objects 29 or file specifications. In a preferred embodiment, entries in the pool 32 from the systems profiles folder are maintained as file specifications, and entries added by the client 24 are maintained as color profile objects 29. The installed color profile entries in the pools 31 are preferably maintained as file specifications so that all of the files in the system profiles folder 30 do not have to be left open during the life of a client 24. Maintaining color profile entries as file specifications means the files in the system profiles folder need not be opened until a color profile object is needed that contains the same information as a color profile identification.

In one preferred embodiment, a color profile identification is implemented as a data structure, such as the following:

```
struct UniqueIdentification {
    Fixed              idVersion;
    char               profileFileName[anySize];
    Header             profileHeader;
    dateTimeNumber     modification Date;
    short              profileFileNameLen;
    short              profileDescriptionLen;
    ScriptCode         profileDescriptionScript;
    char               profileDescription[anySize];
};
```

An improved method and system for managing color profiles has been disclosed. Software written according to the present invention is to be stored in some form of computer-readable medium, such as memory or CD-ROM, or transmitted over a network, and executed by a processor.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for managing color profiles in a computer document, each of the color profiles including a color profile object having data, the method comprising the steps of:
    (a) creating a color profile identification for each of the color profile objects, each of the color profile identifications including at least two parameters identifying the color profile object;
    (b) specifying each of the color profile objects located in the computer document by placing in the computer document the color profile identification which corresponds thereto in each location where the color profile object is used;
    (c) identifying non-system color profile objects from among the color profile objects; and
    (d) causing the data of the non-system color profile objects to be embedded only once in the computer document, wherein the computer document becomes portable to other systems.

2. A method as in claim 1 wherein step (a) further includes the step of:
    (a1) providing a profile description tag as one of the at least two parameters.

3. A method as in claim 2 wherein step (a) further includes the step of:
    (a2) providing a profile header as one of the at least two parameters.

4. A method as in claim 3 wherein step (a) further includes the step of:
    (a3) providing a modification date as one of the at least two parameters.

5. A method as in claim 4 wherein step (a) further includes the step of:
    (a4) providing a system profile file name as one of the at least two parameters.

6. A method as in claim 1, wherein the non-system color profile objects identifying step (c) further includes the step of:
    (cl) identifying the non-system color profile objects from among the color profile objects which have been created or modified by a client.

7. A method as in claim 1 wherein each of the color profile identifications includes:
    a Profile Description tag;
    a Profile Header;
    a System Profile File Name; and
    a Modification Date.

8. A system for managing color profiles in a computer document comprising:
    a plurality of color profile objects;
    a color profile manager for managing the plurality of color profile objects, each of the plurality of color profile objects being identified by a color profile identification which includes at least two parameters for identifying the corresponding color profile objects;
    a database pool for locating the plurality of color profile objects, wherein the database pool has been initialized to include file specifications for referencing files in a system profiles folder; and
    at least one client in communication with the color profile manager for requesting color profile objects for the document, wherein the color profile manager searches the document and then the database pool for locating for each of the color profile identifications in the document a matching color profile object, and returns the matching color profile object to the client once found.

9. A system as in claim 8 wherein one of the at least two parameters is a profile description tag.

10. A system as in claim 9 wherein one of the at least two parameters is a profile header.

11. A system as in claim 10 wherein one of the at least two parameters is a modification date.

12. A system as in claim 11 wherein one of the at least two parameters is a system profile file name.

13. A system as in claim 12 wherein the first color profile object is embedded in the document.

14. A computer-readable medium containing program instructions for managing color profiles in a computer document, each of the color profiles including a color profile object having data, the program instructions for:
    (a) creating a color profile identification for each of the color profile objects, the unique identification including at least two parameters identifying the color profile objects;
    (b) specifying each of the color profile objects located in the computer document by placing in the computer document the color profile identification which corresponds thereto in each location where the first color profile object is used;
    (c) identifying non-system color profile objects from among the color profile objects; and
    (d) causing the data of the non-system color profile objects to be embedded only once in the computer document, wherein the computer document becomes portable to other systems.

15. A computer-readable medium as in claim 14 wherein instruction (a) further includes an instruction for:
    (a1) providing a profile description tag as one of the at least two parameters.

16. A computer-readable medium as in claim 15 wherein instruction (a) further includes an instruction for:
    (a2) providing a profile header as one of the at least two parameters.

17. A computer-readable medium as in claim 16 wherein instruction (a) further includes an instruction for:
    (a3) providing a modification date as one of the at least two parameters.

18. A computer-readable medium as in claim 17 wherein instruction (a) further includes an instruction for:
    (a4) providing a system profile file name as one of the at least two parameters.

19. A method for managing color profiles in a graphics system wherein a document that is to be displayed or printed by a client specifies color profile objects therein using respective unique profile identifications, and the client requests the color profile objects from the graphics system using the unique profile identifications, each of the unique profile identifications including a first parameter, a second parameter, and a third parameter, the method comprising the steps of:
    loading any color profile objects embedded in the document into a database pool as document entries, wherein the database pool has been initialized to include system entries containing file specifications for referencing files in a system profiles folder;
    receiving a request containing a unique profile identification;

searching the document entries in the database pool for color profile objects that match the first parameter of the unique profile identification;

if no match is found, searching a remainder of the database pool for color profile objects that match the second parameter, wherein the remainder includes system entries;

from among color profile objects matching one of the first and second parameters, searching for the color profile objects that match the third parameter; and if a match is found, returning the best matching color profile object to the client.

20. A method as in claim 19 wherein the first parameter is a profile description tag, the second parameter is a profile header, and the third parameter is a modification date.

21. A method as in claim 20 further including the step of:

warning to the client that proceeding to print/draw the document may produce incorrect results if no color profile object matches the modification date.

22. A data structure for identifying a color profile object associated therewith in a system for managing color profiles, the system including a processor, a display, and a memory for storing the data structure, the data structure comprising:

a Profile Description tag;

a Profile Header including a plurality of fields, at least one of the plurality of fields includes a rendering intent;

a System Profile File Name; and a Modification Date including a profile last-calibrated date.

* * * * *